United States Patent
Widmer

(10) Patent No.: US 12,013,124 B2
(45) Date of Patent: Jun. 18, 2024

(54) COMBINATION OUTDOOR VENTLESS FIREPLACE AND BRICK OVEN

(71) Applicant: ROUND GROVE PRODUCTS, LLC, Dalton, OH (US)

(72) Inventor: Scott Widmer, Dalton, OH (US)

(73) Assignee: ROUND GROVE PRODUCTS, LLC, Dalton, OH (US)

(*) Notice: Subject to any disclaimer, the term of this patent is extended or adjusted under 35 U.S.C. 154(b) by 516 days.

(21) Appl. No.: 17/333,262

(22) Filed: May 28, 2021

(65) Prior Publication Data

US 2021/0285645 A1 Sep. 16, 2021

Related U.S. Application Data

(63) Continuation of application No. 16/400,124, filed on May 1, 2019, now Pat. No. 11,022,315.

(60) Provisional application No. 62/714,848, filed on Aug. 6, 2018.

(51) Int. Cl.
| | |
|---|---|
| *A21B 1/00* | (2006.01) |
| *F24B 1/00* | (2006.01) |
| *F24B 1/182* | (2006.01) |
| *F24B 7/00* | (2006.01) |
| *F25C 1/04* | (2018.01) |

(52) U.S. Cl.
CPC ............. *F24B 1/182* (2013.01); *A21B 1/00* (2013.01); *F24B 1/00* (2013.01); *F24B 7/00* (2013.01); *F25C 1/04* (2013.01)

(58) Field of Classification Search
CPC .... F24B 1/182; F24B 1/00; F24B 7/00; A21B 1/00; F25C 1/04
USPC ................................................ 126/506
See application file for complete search history.

(56) References Cited

U.S. PATENT DOCUMENTS

| | | | |
|---|---|---|---|
| 1,451,246 A | | 4/1922 | Wetzel |
| 1,862,009 A | * | 6/1932 | Dalen ............ F24B 1/24 126/10 |
| 2,212,015 A | | 8/1940 | Dugan |
| D143,927 S | | 2/1946 | Meinecke |
| 3,169,516 A | | 2/1965 | Joseph |
| 3,805,762 A | | 4/1974 | Nelson |
| 4,062,344 A | * | 12/1977 | Mayes ............ F24B 1/182 126/509 |
| 4,159,016 A | | 6/1979 | Johnson |
| 4,253,444 A | | 3/1981 | Johnson |
| 4,702,224 A | | 10/1987 | Griffith |
| 4,793,322 A | * | 12/1988 | Shimek ............ F24C 3/006 126/193 |
| 4,850,332 A | | 7/1989 | Sivonen |

(Continued)

*Primary Examiner* — Avinash A Savani
(74) *Attorney, Agent, or Firm* — Jacob M. Ward; Ward Law Office LLC

(57) ABSTRACT

A combination outdoor ventless fireplace and brick oven system includes a main body with a framework assembly. A fireplace firebox is formed in the framework assembly. An oven firebox is formed in the framework assembly and suspended above the fireplace firebox. A chimney flue is disposed above the oven firebox in the framework assembly. The framework assembly is covered by a refractory heat resistant mortar. The fireplace firebox has an aperture. The system also has a gas line disposed in the framework assembly below the aperture. The gas line is configured to connect the aperture with a gaseous fuel source. A burner pan may be disposed in the aperture.

16 Claims, 9 Drawing Sheets

(56) References Cited

U.S. PATENT DOCUMENTS

| | | | |
|---|---|---|---|
| 5,009,220 A | 4/1991 | Cornelison | |
| 5,347,977 A | 9/1994 | Lehikoinen | |
| 5,351,672 A * | 10/1994 | Barden, III | F24B 1/182 |
| | | | 126/19 R |
| 5,492,055 A | 2/1996 | Nevin | |
| 5,752,500 A | 5/1998 | Jamieson et al. | |
| D396,166 S | 7/1998 | Pavlich | |
| 6,070,572 A | 6/2000 | Casagrande | |
| D468,416 S | 1/2003 | Coleman | |
| 6,615,818 B1 * | 9/2003 | Jimka | F24B 1/18 |
| | | | 126/506 |
| D483,603 S | 12/2003 | Minidis | |
| 7,077,122 B2 | 7/2006 | Lyons et al. | |
| D539,071 S | 3/2007 | O'Brien | |
| D571,601 S | 6/2008 | Kolar | |
| D642,855 S | 8/2011 | de Paula | |
| 8,061,348 B1 * | 11/2011 | Rodriguez | F24B 1/182 |
| | | | 126/1 E |
| D715,084 S | 10/2014 | Hill | |
| 8,931,218 B2 | 1/2015 | Raboine | |
| D727,485 S | 4/2015 | Manthei | |
| 9,074,775 B2 | 7/2015 | McCary, Sr. | |
| 9,383,109 B2 | 7/2016 | Raboine | |
| 9,435,542 B1 | 9/2016 | Goodson | |
| 10,571,130 B2 | 2/2020 | Claridge Huggins | |
| 2002/0083944 A1 | 7/2002 | Darbonne, Sr. | |
| 2004/0237417 A1 * | 12/2004 | Rupp | F24B 1/191 |
| | | | 52/27 |
| 2007/0221191 A1 * | 9/2007 | O'Brien | A47J 37/0713 |
| | | | 126/25 R |
| 2008/0156201 A1 | 7/2008 | Cook | |
| 2009/0044796 A1 | 2/2009 | Amaral | |
| 2012/0153782 A1 * | 6/2012 | Fraser | A47B 77/02 |
| | | | 312/109 |

* cited by examiner

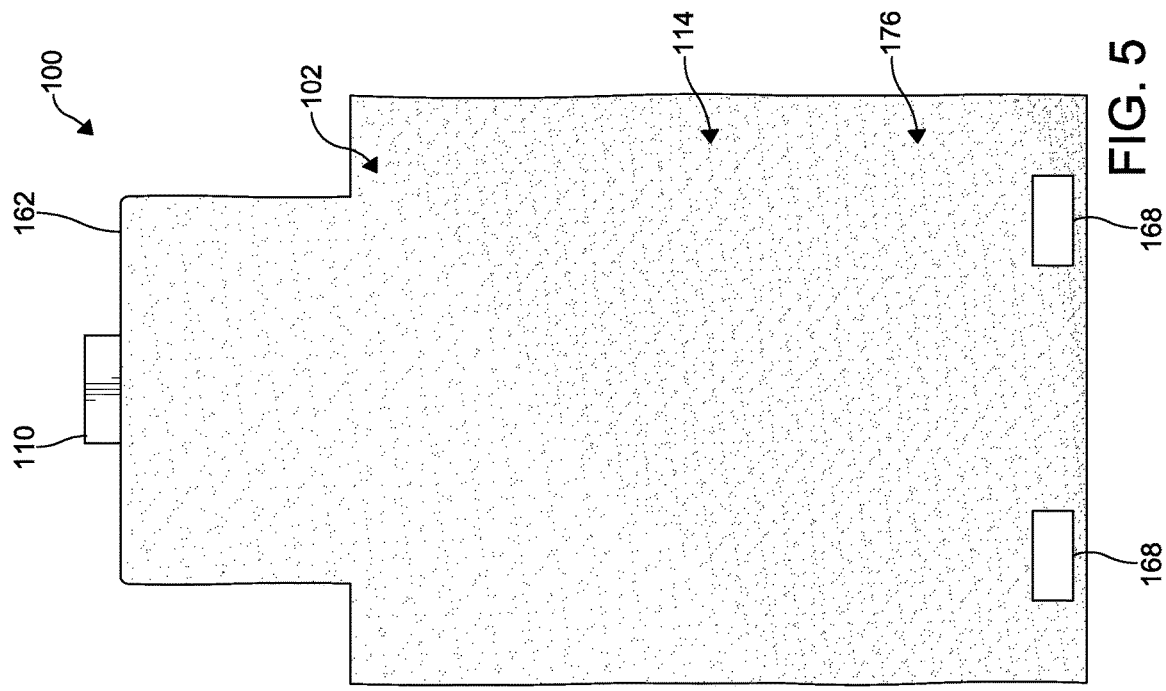
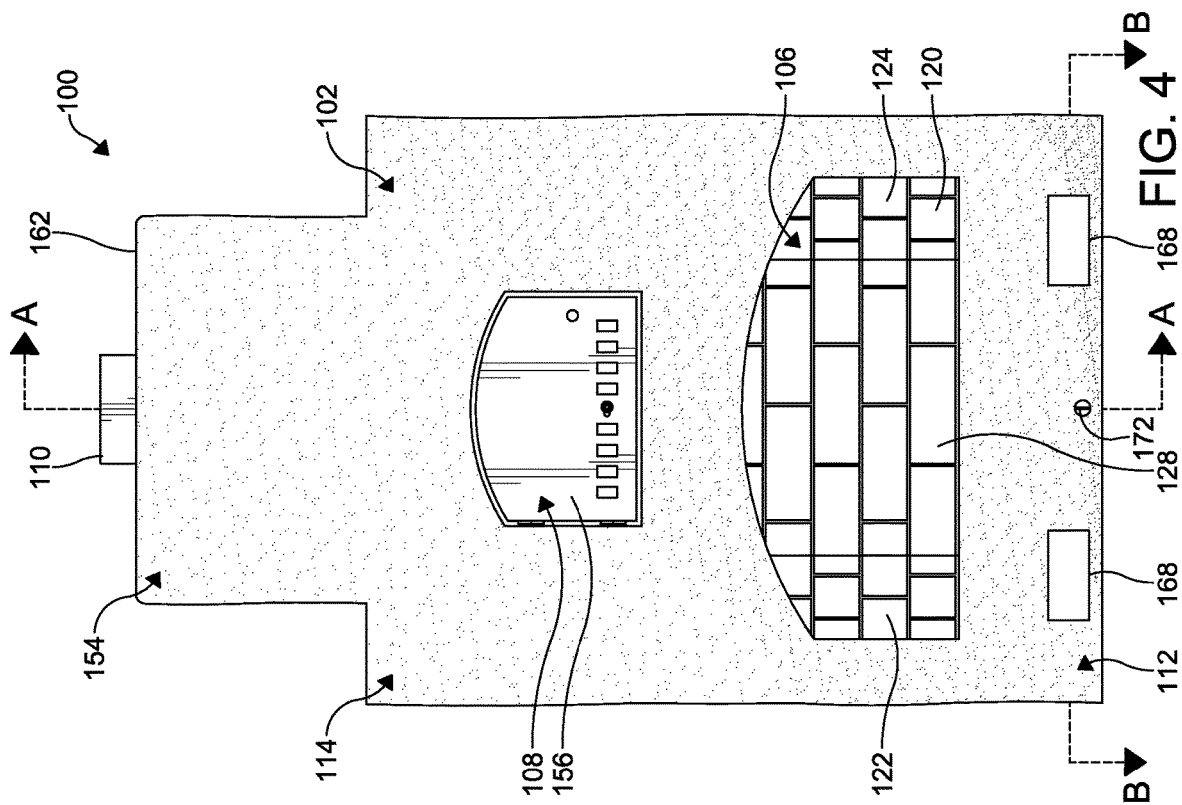
FIG. 4
FIG. 5

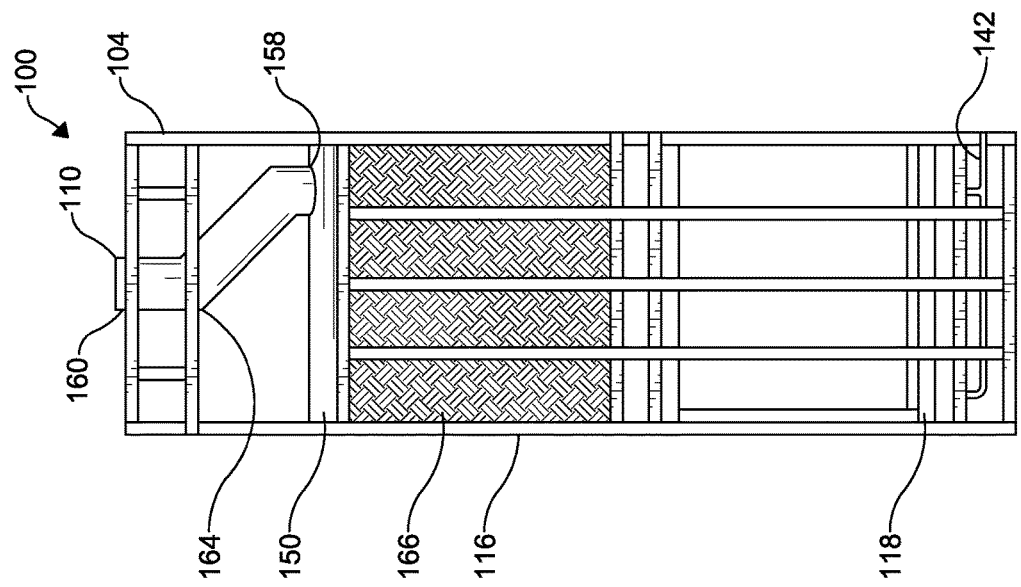
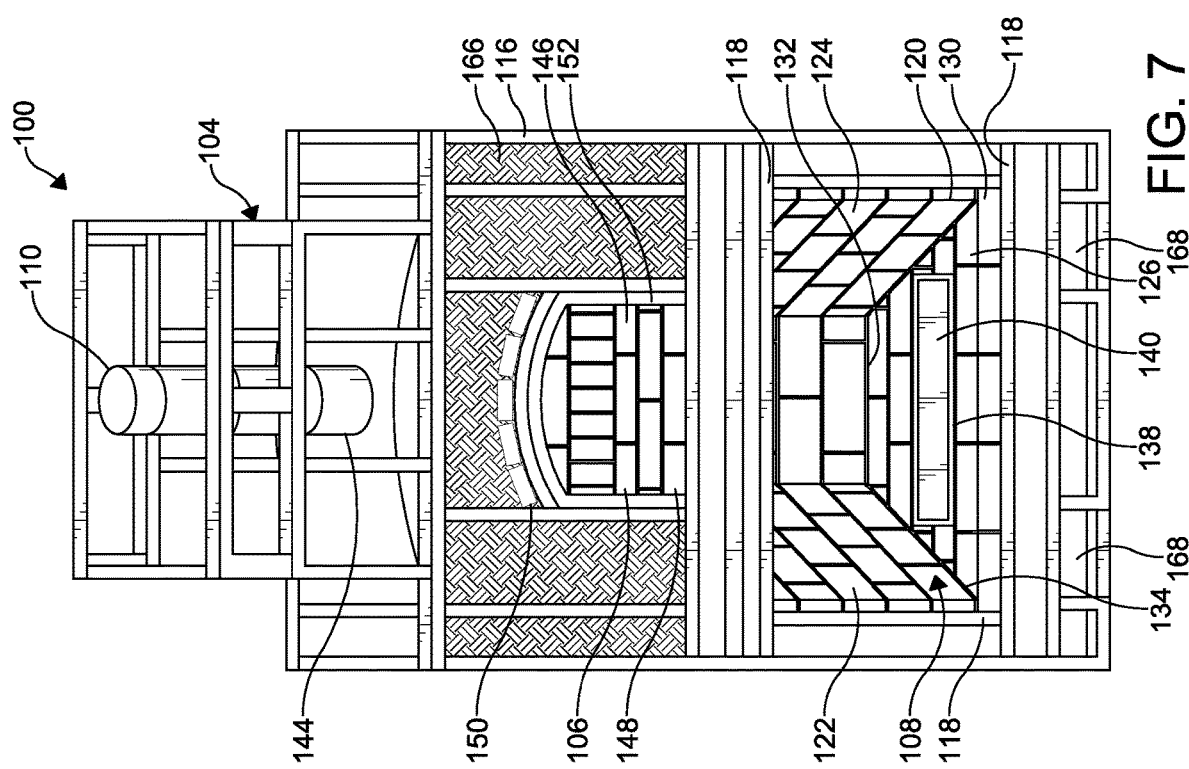

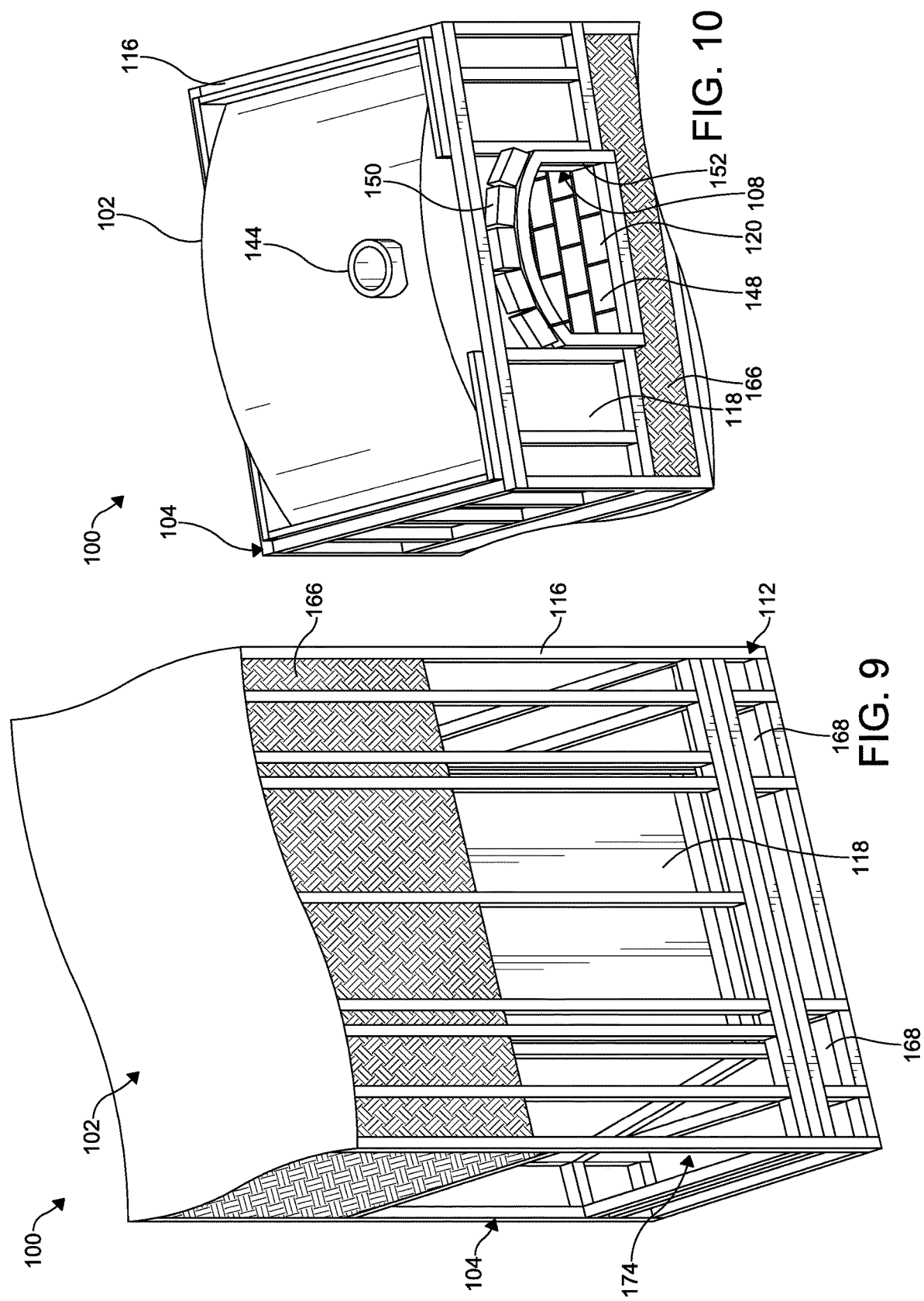

COMBINATION OUTDOOR VENTLESS FIREPLACE AND BRICK OVEN

CROSS-REFERENCE TO RELATED APPLICATIONS

This application claims the benefit of U.S. application Ser. No. 16/400,124, filed on May 1, 2019, which granted as U.S. Pat. No. 11,022,315 on Jun. 1, 2021, which in turn claims the benefit of U.S. Provisional Application No. 62/714,848, filed on Aug. 6, 2018. The entire disclosures of the above applications are incorporated herein by reference.

FIELD

The present disclosure relates to outdoor fireplaces and, in particular, an outdoor gas fireplace having an oven for baking edible goods such as pizza.

BACKGROUND

Outdoor fireplaces have become increasingly popular, either as a landscape feature or as part of an outdoor kitchen. However, construction of an outdoor fireplace has been labor-intensive and consequently expensive. Typical outdoor fireplaces are constructed from brick, block or stone components which are custom built for each installation. In some cases, some of the fireplace components are constructed at a manufacturing facility, while the brick or stone veneer is manually applied at the jobsite.

Outdoor pizza ovens that use solid fuel (e.g. wood, charcoal, pellets, charcoal briquettes, and coal) are also increasingly popular. However, these outdoor pizza ovens often fail to provide adequate, proper, or consistent cooking temperatures. Classically-styled brick ovens are also often large, heavy, and built-in fixtures that are assembled by a skilled craftsman in an end-user's backyard.

There is a continuing need for an outdoor gas fireplace that also facilitates wood-fired baking. Desirably, the combination outdoor ventless fireplace and brick oven is constructed at a manufacturing facility offsite and is easily transportable to a final location for end use.

SUMMARY

In concordance with the instant disclosure, an outdoor gas fireplace that also facilitates wood-fired baking, and which is constructed at a manufacturing facility offsite, and is easily transportable to a final location for end-use, is surprisingly discovered.

In one embodiment, a combination outdoor ventless fireplace and brick oven system includes a main body. The main body has a framework assembly. A fireplace firebox is formed in the framework assembly. An oven firebox is formed in the framework assembly and suspended above the fireplace firebox. A chimney flue is disposed above the oven firebox in the framework assembly. The framework assembly is covered by a refractory heat resistant mortar. The fireplace firebox has an aperture. The system also has a gas line disposed in the framework assembly below the aperture. The gas line is configured to connect the aperture with a gaseous fuel source.

In a further embodiment, a combination outdoor ventless fireplace and brick oven system includes a main body. The main body has a framework assembly. A fireplace firebox is formed in the framework assembly. A cavity is disposed in the framework assembly adjacent to the fireplace firebox. An oven firebox is formed in the framework assembly and suspended above the fireplace firebox. A chimney flue is disposed above the oven firebox in the framework assembly. The framework assembly is covered by a refractory heat resistant mortar. The fireplace firebox has an aperture. The system also has a gas line disposed in the framework assembly below the aperture. The gas line is configured to connect the aperture with a gaseous fuel source.

In an exemplary embodiment, the combination outdoor ventless fireplace and brick oven is constructed using structural panels of 2½" wide 18 gage galvanized U-channels made of top and bottom members that interlock with 2⅜" 18 gage galvanized wide U-channels upright framing members. Each union of the vertical uprights and horizontal top/bottom members is fastened with two screws. The individual panels are fastened together to create the box-frame assembly of the product, or the skeletal framework.

In certain embodiments, the brick oven firebox is insulated from the fireplace firebox. Both fireboxes can function simultaneously and independently of each other. A fire in the oven firebox will only heat that specific space and, vice versa, a fire in the fireplace firebox will only heat that specific space.

In an additional embodiment, the structural framing for lifting and positioning the unit includes a full-depth panel of U-channel members attached to box-iron channels. The box-iron channels allow access for forklift forks, slings, or straps for lifting and positioning the unit. The exposed framing also allows access for anchoring the unit to the foundation slab.

BRIEF DESCRIPTION OF THE DRAWINGS

The drawings described herein are for illustrative purposes only of selected embodiments and not all possible implementations and are not intended to limit the scope of the present disclosure. The above, as well as other advantages of the present disclosure, will become readily apparent to those skilled in the art from the following detailed description, particularly when considered in the light of the photographs and drawings described hereafter.

FIG. 4 is a front elevational view of the combination outdoor ventless fireplace and brick oven system shown in FIG. 1;

FIG. 5 is a rear elevational view of the combination outdoor ventless fireplace and brick oven system shown in FIG. 1;

FIG. 7 is a front elevational view of the combination outdoor ventless fireplace and brick oven system of FIG. 1, shown during construction without a heat resistant mortar in order to illustrate various construction materials;

FIG. 8 is a front elevational view of the combination outdoor ventless fireplace and brick oven system of FIG. 7, shown during construction without a heat resistant mortar in order to illustrate various construction materials;

FIG. 9 is a rear perspective of the combination outdoor ventless fireplace and brick oven system of FIG. 7, shown during construction;

FIG. 10 is a top perspective of an oven firebox the combination outdoor ventless fireplace and brick oven system of FIG. 7, shown during construction;

DETAILED DESCRIPTION

Figure 1:
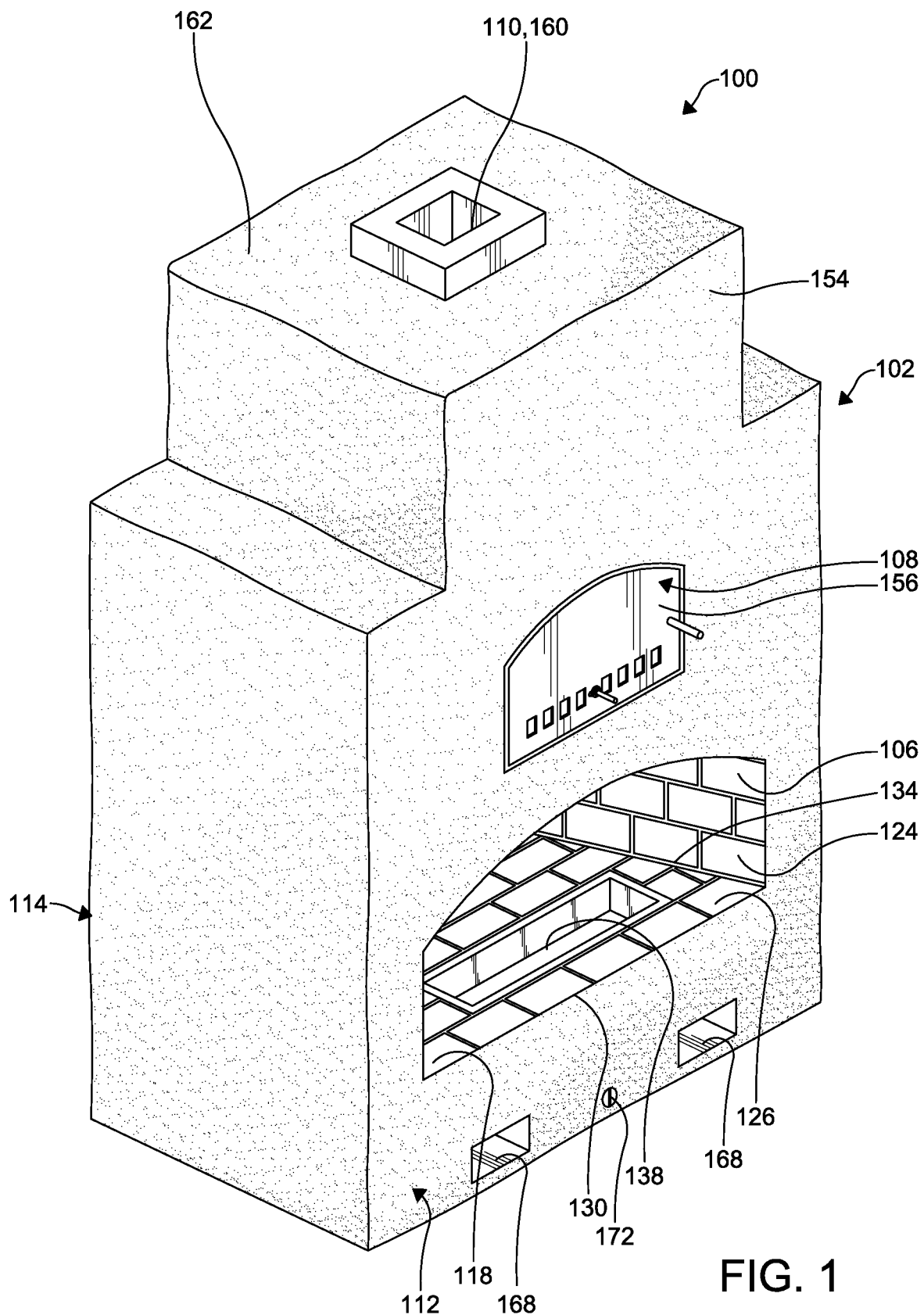
FIG. 1 is a top perspective view of a combination outdoor ventless fireplace and brick oven system according to one embodiment of the disclosure.
Figure 2:
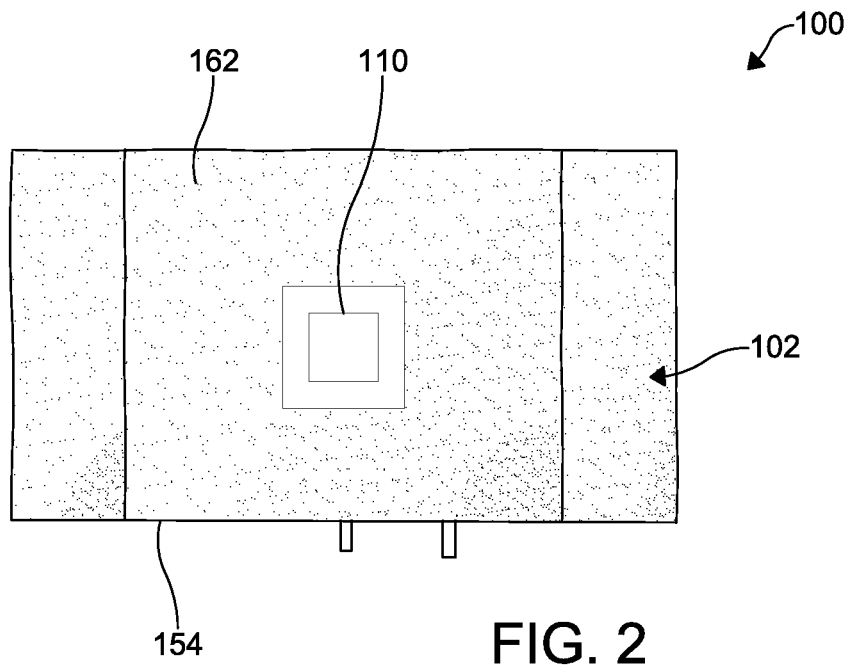
FIG. 2 is a top plan view of the combination outdoor ventless fireplace and brick oven system shown in FIG. 1.

The following description is merely exemplary in nature and is not intended to limit the present disclosure, application, or uses. It should be understood that throughout the drawings, corresponding reference numerals also indicate like or corresponding parts and features.

As shown in FIGS. 1-14, a combination outdoor ventless fireplace and brick oven 100, according to various embodiments of the disclosure, is shown. The system 100 may have a main body 102. The main body 102 may include a framework assembly 104. A fireplace firebox 106 may be formed in the framework assembly 104. An oven firebox 108 may be formed in the framework assembly 104. The oven firebox 108 may be suspended above the fireplace firebox 106. The oven firebox 108 is configured for burning wood and other suitable fireplace media, and also for baking edible goods, such as pizza. A chimney flue 110 may be disposed in the framework assembly above both the fireplace fire box 106 and the oven firebox 108. The system 100 may include base 112.

The framework assembly 104 may be covered by a refractory heat resistant mortar 114. In particular, the framework assembly 104 includes a framework of steel channel members 116, as described further hereinbelow. The steel channel members 116 define chambers for the fireplace firebox 106 and the oven firebox 108 within the framework assembly 104.

In certain embodiments, the framework assembly 104 is formed from galvanized steel channel stock. Galvanized steel channel stock has been found to be particularly suitable for the system 100, especially compared to aluminum stock, which will warp or melt, or common masonry, which will fracture or crack, at the temperatures and heat cycles associated with operation of conventional fireplaces and brick ovens.

In exemplary embodiments, the framework assembly 104 is constructed using structural panels of 2½" wide 18 gage galvanized U-channels made of top and bottom members that interlock with 2⅜" 18 gage galvanized wide U-channels upright framing members. Each union of the vertical uprights and horizontal top/bottom members is fastened with two screws. Then individual panels are fastened together to create the frame work assembly 104 of the product. A skilled artisan may also select other materials and dimensions for the framework assembly 104, as desired.

In certain examples, the refractory heat resistant mortar 114 may be formed from a mixture of fireclay, cement, and sand. Advantageously, the heat resistant mortar 114 may provide a mortar that is both visually appealing and resistant to the temperatures associated with operation of conventional fireplaces and brick ovens. A skilled artisan may select alternative suitable materials for the framework assembly 104 and the refractory heat resistant mortar 114 within the scope of the present disclosure.

Each of the fireplace firebox 106 and the oven firebox 108 may be formed from noncombustible or refractory materials. In one nonlimiting example, each of the fireplace firebox 106 and the oven firebox 108 are formed from noncombustible magnesium oxide board 118 and refractory bricks 120. One of ordinary skill in the art may select other suitable refractory materials for the fireplace firebox 106 and the oven firebox 108, as desired.

As shown in FIGS. 1, 4, and 7 the fireplace firebox 106 may include a first of side wall 122, a second side wall 124, a bottom wall 126, and a rear wall 128. The bottom wall 126 may have a front edge 130. The front edge 130 may have a first length. The bottom wall 126 may have a rear edge 132. The rear edge 132 may have a second length. The first length may be greater than the second length such that the bottom wall 126 is substantially trapezoidal in shape.

The rear wall 128 may be disposed on the rear edge 132 of the bottom wall 126. Each of the first side wall 122 and the second side wall 124 may be disposed on a side edge 134 of the bottom wall 126. Each of the first side wall 122 and the second side wall 124 may define a space that tapers toward the rear wall 128. Advantageously, the first side wall 122 and the second side wall 124 tapering toward the rear wall 128 allows the fireplace firebox 106 to direct hot air at a user of the combination outdoor ventless fireplace and brick oven 100.

Each of the first side wall 122, the second side wall 124, the bottom wall 126, and the rear wall 128 is fabricated from refractory materials. In one non-limiting example, the refractory materials may be formed from noncombustible magnesium oxide board 118 and refractory bricks 120. The noncombustible board 118 may be secured to the steel channel members 116 with fasteners such as screws, bolts, rivets, or the like. The refractory bricks 120 may be laid atop the noncombustible board 118. A skilled artisan may select any suitable material and configuration for the fireplace firebox 106, as desired.

Figure 11:
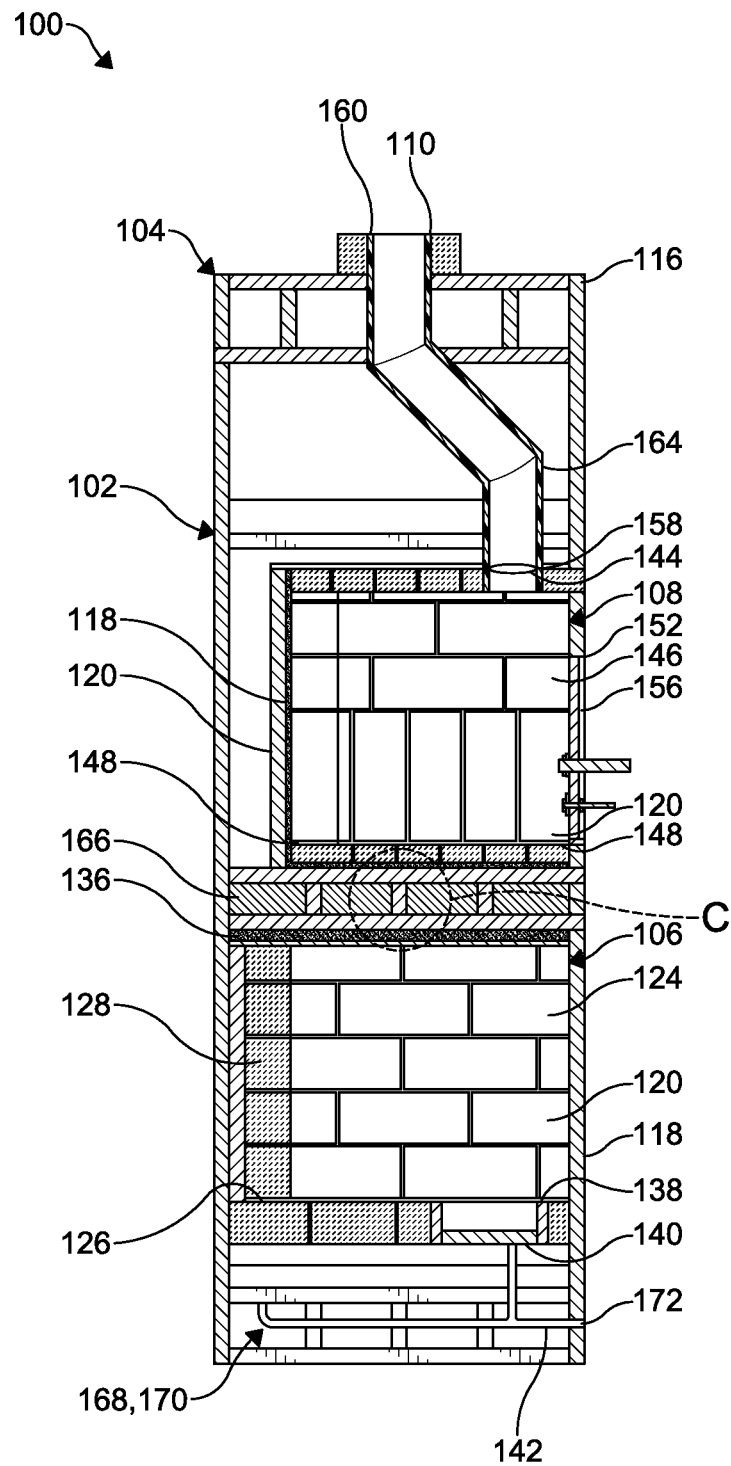
FIG. 11 is a cross-sectional, side elevational depiction of an interior of the combination outdoor ventless fireplace and brick oven system taken at section line A-A in FIG. 4.

As shown in FIG. 11, the fireplace firebox 106 may have a top plate 136. The top plate 136 may be fabricated from noncombustible board 118 and galvanized steel. The noncombustible board 118 may be secured to the steel channel members 116 with fasteners such as screws, bolts, rivets, as non-limiting examples. The galvanized steel top plate 136 may be fastened to the noncombustible board 118.

Advantageously, the top plate 136 may militate against undesirable charring of the fireplace firebox 106. The top plate 136 fabricated from galvanized steel may also militate against damage to the oven firebox 108 or the main body 102. A skilled artisan may select any suitable material for the top plate 136 and any suitable means for securing the top plate 136 to the steel channel members 116.

With renewed reference to FIG. 1, the fireplace firebox 106 may have an aperture 138. The aperture 138 may be configured to receive a burner pan 140. The burner pan 140 may have glass beads, log sets, or linear inserts disposed within. Advantageously. The burner pan 140 may provide a pleasing visual experience for the user. A skilled artisan may select any suitable burner pan 140, as desired.

The system 100 may further include a gas line 142. The gas line 142 may be disposed in the framework assembly 104 beneath the aperture 138. The gas line 142 may have an adapter disposed on an end thereof. The adapter may be configured to connect the aperture 138 with a gaseous fuel source. It should be understood that the gaseous fuel source may be natural gas or propane, as non-limiting examples. A skilled artisan may select any suitable gas source for the fireplace firebox 106, as desired.

The aperture 138 may be formed in the bottom wall 126 of the fireplace firebox 106. The aperture 138 may be formed between the front edge 130 and the rear edge 132 of the fireplace firebox 106. The aperture 138 may be formed adjacent the front edge 130 and spaced apart from the rear edge 132.

Advantageously, the aperture 138 is near an opening in the fireplace firebox 106 such that, in operation, the burner pan 140 is nearer a user of the system 100. The burner pan 140 may provide more heat to the user than if the burner pan 140 was formed further in the fireplace firebox 106.

As shown in FIGS. 7 and 10, the oven firebox 108 may have a plurality of side walls 146, a cooking surface 148, and a domed ceiling 150. Each of the sidewalls 146, the cooking surface 148, and the domed ceiling 150 may be fabricated from refractory materials. The domed ceiling 150 may be fabricated from refractory bricks 120 disposed in an arch. Advantageously, the domed ceiling 150 may trap and radiate heat into the oven firebox 108 providing optimized temperatures when cooking.

In one non-limiting example, the refractory materials may be formed from noncombustible magnesium oxide board 118 and refractory bricks 120. The noncombustible board 118 may be secured to the steel channel members 116 with fasteners such as screws, bolts, rivets, or the like. The refractory bricks 120 may be laid atop the noncombustible board 118. A skilled artisan may select any suitable material and configuration for the oven firebox 108, as desired.

The oven firebox 108 may have an opening 152 at a front wall 154 of the main body 102. The opening 152 of the oven firebox 108 may be selectively closed by an oven door 156. The oven door 156 may be hingedly attached to the front wall 154 of the main body 102, for example.

In certain examples, the oven door 156 may be formed from stainless steel, cast iron, or mild steel, as non-limiting examples. The oven door 156 may have a grate that may be selectively opened and closed in order to control a supply of air to a fire burning within the oven firebox 108. A skilled artisan may select any suitable material and configuration for the oven door 156, as desired.

As illustrated in FIGS. 8 and 11, the combination gas fireplace and oven system 100 may have a chimney flue 110. The chimney flue 110 may be disposed in the framework assembly 104 above the oven firebox 108. The chimney 110 may have a first end 158 and a second end 160. The first end 158 of the chimney may be disposed on the domed ceiling 150. The second end 160 of the chimney flue 110 may be disposed on an exterior top wall 162 of the main body 102.

In certain embodiments, the first end 158 may be disposed on the domed ceiling 150 at a vent 144. As depicted in FIG. 10, the vent 144 may be formed in the domed ceiling 150 of the oven firebox 108 adjacent to the opening 152 of the oven firebox 108. The second end 160 of the chimney flue 110 may be disposed centrally on the exterior top wall 162 of the main body 102 such that the chimney flue 110 may have an elbow 164, as depicted in FIG. 8.

Advantageously, the elbow 164 of the chimney flue 110 allows the desirable placement of the chimney 110 near the opening 152 of the oven firebox 108, which has been found to be an optimal positioning for a chimney in a brick oven. The elbow 164 further allows for the central placement of the second end 160 of the chimney flue, which, in operation, is desirable for the user as it directs any smoke or gas from the chimney flue 110 away from the user.

Although not specifically shown, it should be understood that the chimney flue 110 may include a chimney damper or flap inside or at a top of the chimney flue 110, which can be adjusted manually to allow smoke to escape or air to enter. The chimney damper may be formed of metal or ceramic so as to tolerate the heat from the smoke and hot gases. The chimney damper may be opened and closed through a variety of suitable mechanisms, for example, a latch, a pull chain, or a handle, as desired.

The fireplace firebox 106 and the oven firebox 108 may be thermally insulated from one another. For example, the fireplace firebox 106 and the oven firebox 108 may be separated by an insulating arrangement of steel channel members 116, insulation 166 such as mineral wool insulation, and a noncombustible board 118 such as magnesium oxide board, as a non-limiting example. A skilled artisan may select any suitable insulation materials, as desired.

Figure 12:
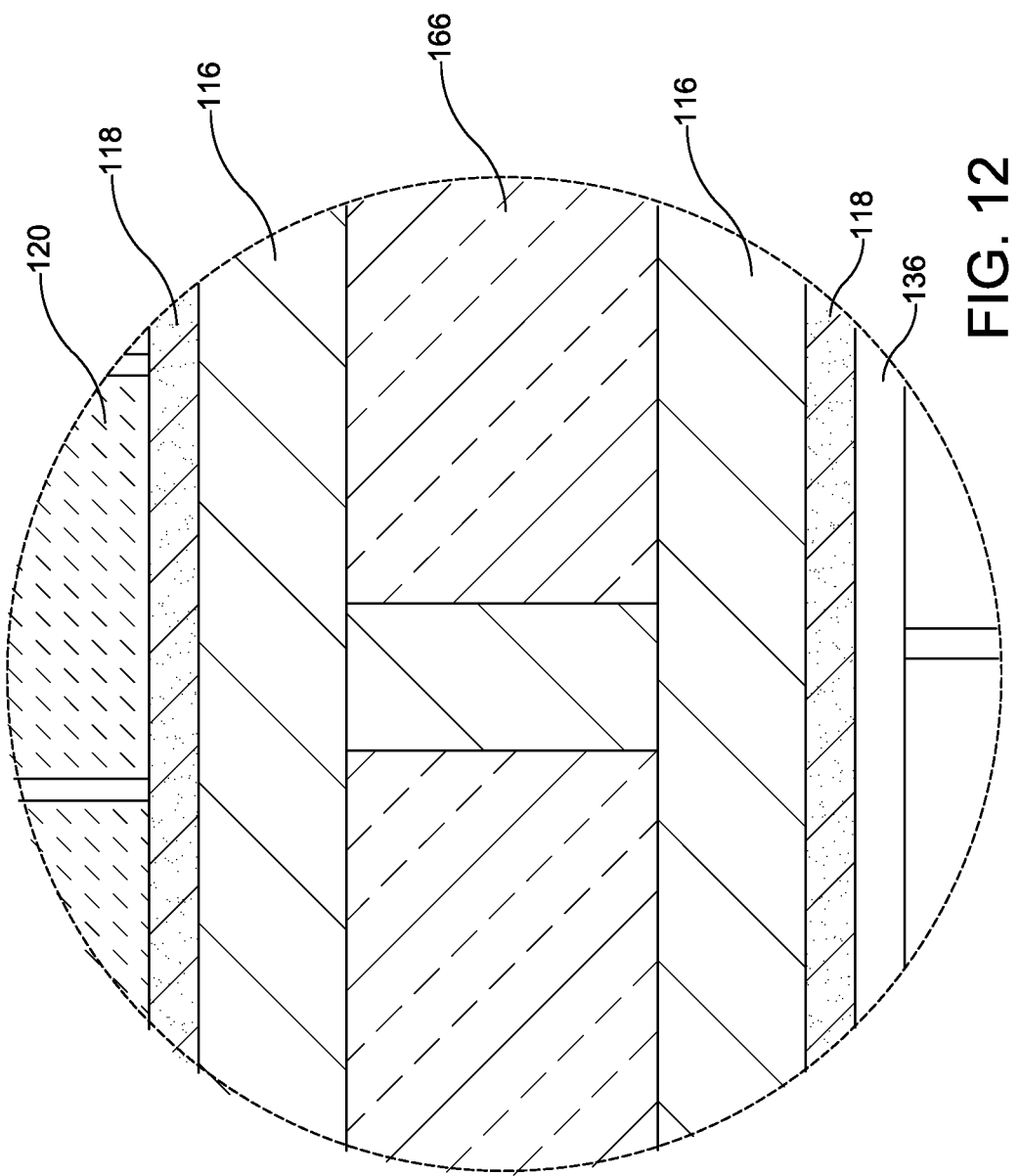
FIG. 12 is an enlarged fragmentary, cross-sectional, side elevational view of the interior of the combination outdoor ventless fireplace and brick oven system taken at callout C in FIG. 11.

As shown in FIGS. 11 and 12, the insulation 166 may be disposed within a hollow portion of the steel channel members 116, between the noncombustible board 118 of the fireplace firebox 106 and the noncombustible board 118 of the oven firebox 108, for example. Advantageously, heat transfer between the fireplace and oven fireboxes 106, 108 is minimized during an operation of the system 100. Other suitable insulating means are also contemplated and considered within the scope of the present disclosure.

It should be understood that each of the fireplace and oven fireboxes 106, 108 may function simultaneously. The user of the combination outdoor ventless fireplace and brick oven 100 may choose to utilize only one of each of fireplace and oven fireboxes 106, 108, as desired. A fire in the oven firebox 108 will only heat that specific space and, vice versa, a fire in the fireplace firebox 106 will only heat that specific space.

Figure 3:
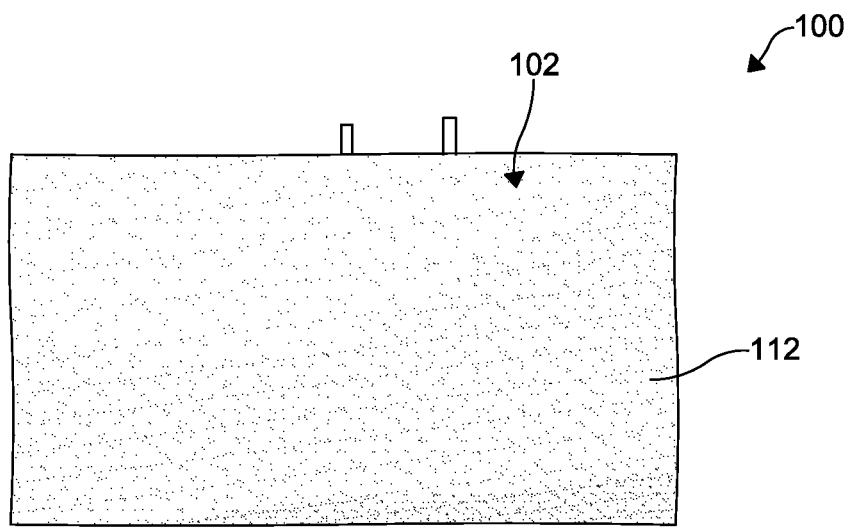
FIG. 3 is a bottom plan view of the combination outdoor ventless fireplace and brick oven system shown in FIG. 1.
Figure 6:
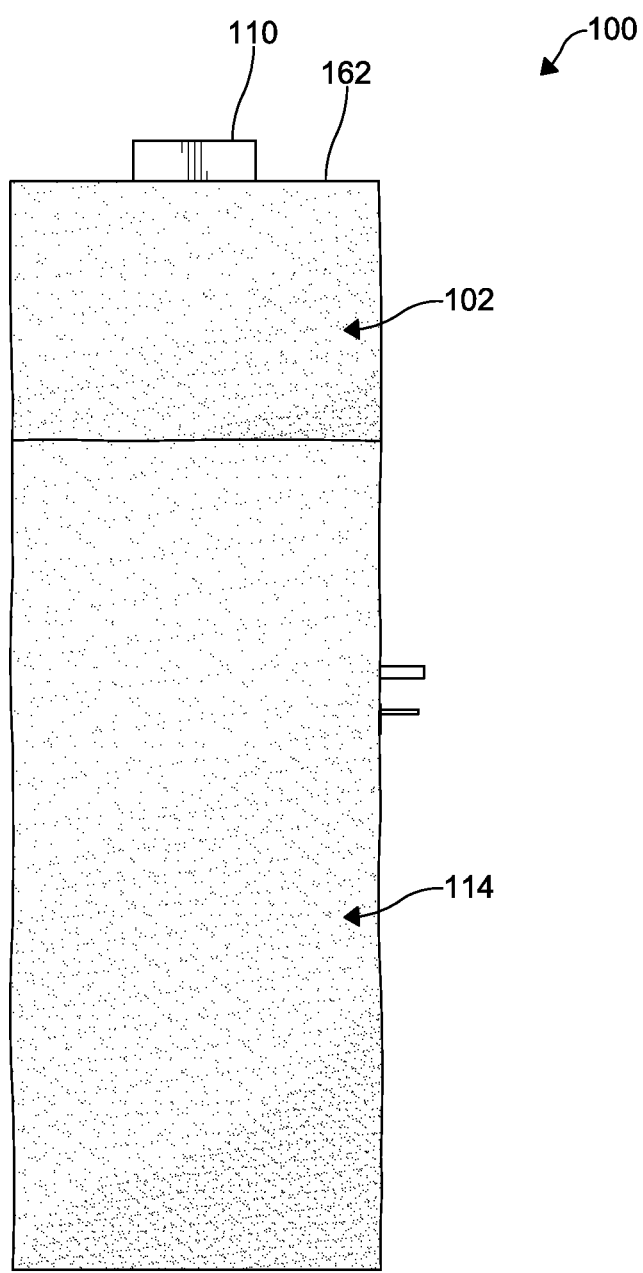
FIG. 6 is a right side elevational view of the combination outdoor ventless fireplace and
brick oven system shown in FIG. 1.

As depicted in FIGS. 1 and 3-4, the base 112 may be disposed beneath the fireplace firebox 106. Advantageously, the base 112 is configured to facilitate a transport of the combination outdoor ventless fireplace and brick oven 100, for example, from a location of manufacture to an end user's location.

The base 112 may include a pair of holes 168 formed in the front wall 154 of the main body 102. Advantageously, the pair of holes 168 may be configured to receive at least one of forklift forks, slings, and straps for lifting and positioning the combination outdoor ventless fireplace and brick oven 100.

In a particular example, the holes 168 may be defined by a pair of box-iron channels 170. The pair of box iron channels 170 may be connected to the framework assembly 104. In other examples (not shown), the box-iron channels 170 may project outwardly from the main body to define a step of the combination outdoor ventless fireplace and brick oven 100. Other suitable means of forming the holes 168 to securely and conveniently move the system 100 are also considered within the scope of the present disclosure.

Figure 13:
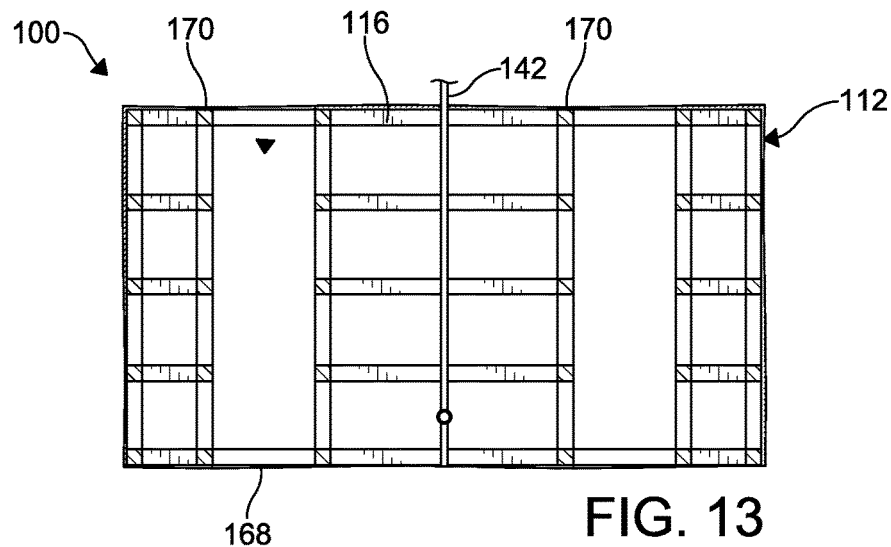
FIG. 13 is a cross-sectional, top plan view of an interior of a base of the combination outdoor ventless fireplace and brick oven system taken at section line B-B in FIG. 4.

As shown in FIG. 13, the gas line 142 may be disposed in the base 112. More specifically, the gas line 142 may between the pair of box-iron channels 170. The gas line 142 may run from the aperture 138 to an outer wall of the main body 102, for example, the gas line 142 may exit the main body 102 through a rear wall 176 or a side wall 178. Advantageously, the placement of the gas line 142 militates against undesirable damage to the gas line. The system 100 may be moved via forklift, for example, without puncturing or otherwise damaging the gas line 142.

With renewed reference to FIG. 1, the gas line 142 may be connected to a gas valve 172. The gas valve may be disposed in the front wall 154 of the main body 102. Advantageously, the gas valve 172 allows the user to turn on the flow of gas from the gaseous fuel source to the burner pan 140. A skilled artisan may select any suitable gas valve 172 and any suitable placement for the gas valve 172, as desired.

Figure 14:
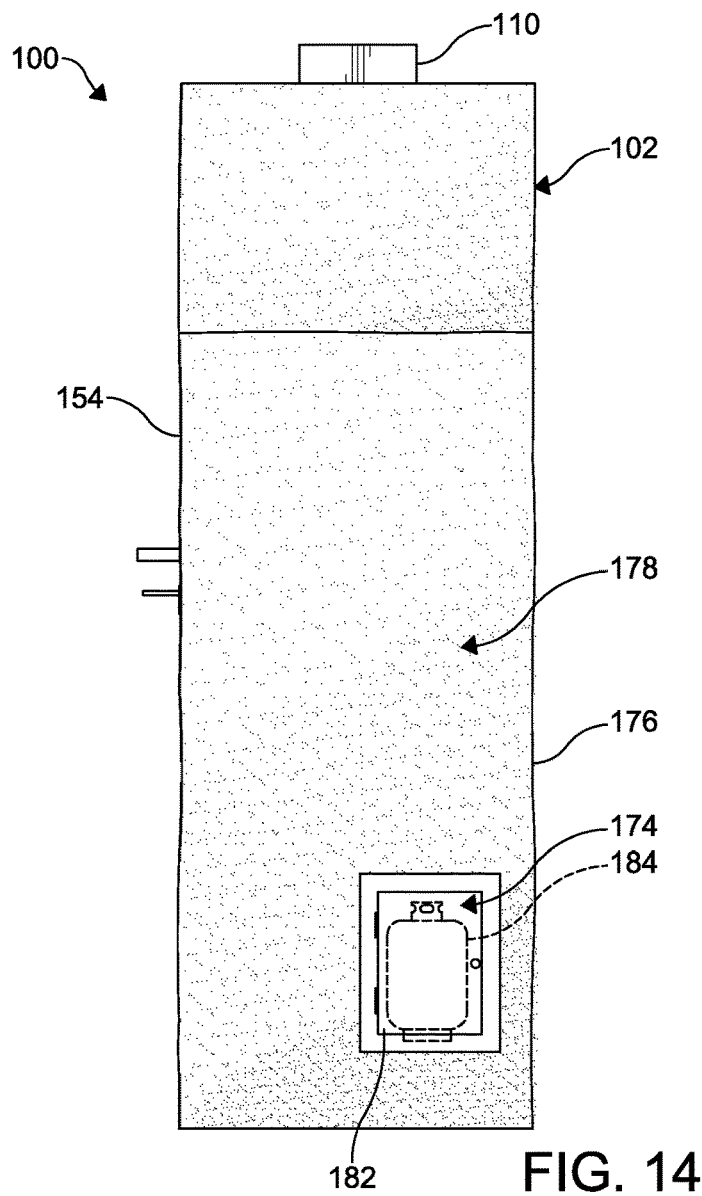
FIG. 14 is a side elevational view of a combination outdoor ventless fireplace and brick oven system according to another embodiment of the disclosure, depicting a fuel tank disposed in a cavity of the system.

According to certain embodiments of the present disclosure, for example, as shown in FIG. 14, the combination gas fireplace and oven system 100 may have a cavity 174. The cavity 174 may be disposed in the framework assembly 104 adjacent to the fireplace firebox 108. The cavity 174 may be configured to receive a fuel tank 184. The fuel tank 184 may be disposed in the cavity 174. The fuel tank 184 may contain, as a non-limiting example, propane. A skilled artisan may select any suitable fuel for the fuel tank 184, as desired.

The cavity 174 may be further defined by the side wall 178 of the main body 102, a rear wall 176 of the main body 102, and the second side wall 124 of the fireplace firebox 106. A skilled artisan may select any suitable location for the cavity 174, as desired.

The cavity 174 may have an opening 180 at the side wall 178 of the main body 102. The opening 180 of the cavity 174 may be selectively closed by a cavity door 182. The cavity door may be hingedly attached to the side wall 178 of the main body 102. In certain examples, the cavity door 182 may be formed from stainless steel. Advantageously, the cavity door 182 allows a user of the system 100 to easily replace the fuel tank 142, as needed. A skilled artisan may select any suitable material and configuration for the cavity door 182, as desired.

In this embodiment, the gas line 142 may be disposed in the base 112. More specifically, the gas line 142 including the adapter may between the pair of box-iron channels 170. The gas line 142 may run from the aperture 138 to the cavity 174. Advantageously, the placement of the gas line 142 militates against undesirable damage to the gas line. The system 100 may be moved via forklift, for example, without puncturing or otherwise damaging the gas line 142.

Advantageously, the combination outdoor ventless fireplace and brick oven 100 facilitates the baking of edible goods such as pizzas in an outdoor environment but may be constructed at a manufacturing facility offsite and easily transported to a final location for end use.

While certain representative embodiments and details have been shown for purposes of illustrating the invention, it will be apparent to those skilled in the art that various changes may be made without departing from the scope of the disclosure, which is further described in the following appended claims.

What is claimed is:

1. A combination outdoor ventless fireplace and brick oven system, comprising:
a main body including a framework assembly, a fireplace firebox formed in the framework assembly, an oven firebox formed in the framework assembly suspended above the fireplace firebox, and a chimney flue disposed above the oven firebox in the framework assembly, the fireplace firebox and the oven firebox are thermally insulated from one another, the framework assembly covered by a refractory heat resistant mortar, the fireplace firebox having an aperture, wherein the aperture includes a recessed portion in a bottom wall of the fireplace firebox;
a gas line disposed in the framework assembly below the aperture that is configured to connect the aperture with a gaseous fuel source; and
a burner pan disposed in the aperture and connected to the gas line, the gas line connected to the burner pan, the gaseous fuel source, and a gas valve disposed on a front exterior wall of the main body.

2. The combination outdoor ventless fireplace and brick oven system of claim 1, wherein the fireplace firebox includes a pair of side walls, the bottom wall, and a rear wall, and wherein the bottom wall has a front edge with a first length and a rear edge with a second length, and the first length is greater than the second length.

3. The combination outdoor ventless fireplace and brick oven system of claim 2, wherein the aperture is formed in the bottom wall of the fireplace firebox adjacent the front edge and spaced apart from the rear edge.

4. The combination outdoor ventless fireplace and brick oven system of claim 2, wherein each of the pair of side walls defines a space that tapers toward the rear wall.

5. The combination outdoor ventless fireplace and brick oven system of claim 1, wherein the oven firebox includes a domed ceiling with a vent disposed therethrough.

6. The combination outdoor ventless fireplace and brick oven system of claim 5, wherein the chimney flue includes a first end and a second end, the first end is coupled to the vent, the second end is disposed centrally through an exterior top wall of the main body, and the first end is substantially offset from the second end.

7. The combination outdoor ventless fireplace and brick oven system of claim 5, wherein the vent is disposed adjacent to an opening of the oven firebox and spaced apart from a rear wall of the oven firebox.

8. The combination outdoor ventless fireplace and brick oven system of claim 6, wherein the first end of the chimney flue is offset from the second end of the chimney flue through the use of an elbow.

9. The combination outdoor ventless fireplace and brick oven system of claim 1, wherein the fireplace firebox includes a top plate fabricated from galvanized steel.

10. The combination outdoor ventless fireplace and brick oven system of claim 1, wherein the main body has a cavity formed in the framework assembly.

11. The combination outdoor ventless fireplace and brick oven system of claim 10, wherein the cavity is defined by an outer side wall of the main body, an outer rear wall of the main body, and one of the pair of side walls of the fireplace firebox.

12. The combination outdoor ventless fireplace and brick oven system of claim 11, wherein the cavity has an opening at a side wall of the main body.

13. The combination outdoor ventless fireplace and brick oven system of claim 12, wherein the opening of the cavity is selectively closed by a cavity door hingedly attached to the side wall of the main body.

14. A combination outdoor ventless fireplace and brick oven system, comprising:
a main body including a framework assembly, a fireplace firebox formed in the framework assembly, an oven firebox formed in the framework assembly suspended above the fireplace firebox, and a chimney flue disposed above the oven firebox in the framework assembly, the fireplace firebox and the oven firebox are thermally insulated from one another, the framework assembly covered by a refractory heat resistant mortar, the fireplace firebox having an aperture; and a gas line disposed in the framework assembly below the aperture that is configured to connect the aperture with a gaseous fuel source, wherein the fireplace firebox and the oven firebox are thermally insulated from one another by a steel channel member, insulation material, and a noncombustible board.

15. The combination outdoor ventless fireplace and brick oven system of claim 14, wherein the fireplace firebox and the oven firebox are thermally insulated from one another by sandwiching a layer of the insulation material between a pair of layers of the steel channel members, and a pair of layers of the noncombustible board.

16. The combination outdoor ventless fireplace and brick oven system of claim 15, wherein a layer of refractory bricks is disposed over one of the layers of noncombustible board.

\* \* \* \* \*